Patented Nov. 15, 1927.

1,649,261

UNITED STATES PATENT OFFICE.

GUSTAV A. SCHULTHEISS, OF KANSAS CITY, KANSAS.

PROCESS OF PRODUCING ANTIFREEZING SOLUTIONS.

No Drawing.   Application filed January 10, 1927.   Serial No. 160,311.

This invention relates to anti-freezing solutions and a process for making the same, the invention being more particularly directed to that type of solution described and claimed in my Patent No. 1,605,377 granted November 2, 1926.

It is a well known fact that calcium chloride due to its extremely low freezing point provides a very valuable cooling solution. However, the solution acts upon most metals and also the solder forming the connections so that its usefulness is considerably impaired by reason of such disadvantage.

It is an object of the present invention to provide a solution of calcium chloride in which ingredients are incorporated to prevent the action of the calcium chloride on the metals forming the containers in which the solutions are stored.

A further object of the invention is the provision of a process for producing a calcium chloride solution having a predetermined quantity of oils or fats embodied therein and in such a manner that the calcium chloride solution containing the oils and fats may be readily mixed with any quantity of water without causing releasing of the oils or fats, such oils or fats being adapted to form a coating on the walls of the metal container to protect the walls from the action of the calcium chloride.

A still further object of the invention is the provision of a simple, inexpensive and rapid process for the production of an anti-freezing mixture in which any quantity of oils or fats may be embodied in the mixture which is capable of being mixed with water, the oils or fats being retained in the mixture after the addition of the water.

This invention will be best understood from a consideration of the following detailed description; nevertheless it is to be understood that the invention is not confined to the disclosure, being susceptible of such changes and modifications which shall define no material departure from the salient features of the invention, as expressed in the appended claims.

The principle upon which this invention is based is the fact that when an animal oil or a vegetable oil or any of the compounds or derivatives of certain of the oils is slowly boiled with a solution of calcium chloride the calcium chloride solution will take up a predetermined quantity of the oily or fatty matter so that when the mixture or solution thus formed is mixed with water the oily or fatty matter is still retained in the solution and only released when the solution comes in contact with a surface, particularly metallic. This is particularly true where oils or fats are employed in their natural state, such as beans or seeds, for boiling with a calcium chloride solution.

In carrying out my invention the Indian bean or any bean or vegetable matter containing fats or oils, is ground or crushed and boiled in a calcium chloride solution for fifteen (15) or twenty (20) minutes. The beans are slowly boiled and the time for treatment depends upon the quantity of oil or fat in the beans, and this is also true of the quantity employed. I mix approximately two (2) to four (4) ounces of the castor or India bean by weight with approximately one (1) gallon of calcium chloride (75% pure). The boiling is maintained at a temperature of from 90 to 100 degrees C. and the calcium chloride solution should register approximately 30 degrees Baumé. After the period of boiling, and after it has been determined that sufficient fatty matter has been recovered from the beans, the solution is then strained or siphoned off while hot. The solution thus formed, which I designate as solution "A", is ready for use and is adapted to be employed in large refrigerating systems or in other systems where calcium chloride is employed as a cooling medium or anti-freezing solution and where the calcium chloride will come in contact with the metal. The mixture of oily matter and calcium chloride are thoroughly agitated during boiling.

In a modified form of the above described process the beans or other vegetable matter containing oils or fats are placed in hot calcium chloride and the beans are allowed to steep. The oil is pressed from the beans or vegetable matter by any approved method and then the whole is boiled for approximately fifteen (15) minutes. In either case slow boiling is required and the solution containing the vegetable matter must be thoroughly agitated during ebulition. This solution I designate as "B".

The temperature in the second mentioned process is maintained at approximately 90 to 100 degrees C. and the strength of the calcium chloride solution is approximately thirty (30) degrees Baumé. When this solution is still hot it is strained or siphoned off. After cooling the solution is placed in storage and used when required.

When it is desired to employ the solution as an anti-freezing solution in radiators and cooling jackets of internal combustion engines I modify the above solution by the addition of a solution formed of alcohol and machine castor oil or paraffine oils, which solution is designated as "C". In this case I thoroughly mix one and one-half (1½) ounces of the machine castor or paraffine oil with a quart of the alcohol. When either the alcohol or the oil contains impurities the proportion must be varied in order to increase the oil content of the alcohol. The oil and alcohol in the proportions named are thoroughly agitated in order that the oil will be properly incorporated in the alcohol and this mixture is then allowed to stand from twenty-four (24) to forty-eight (48) hours in order to permit the alcohol to dissolve the oil. The length of time, of course, required for the solution to stand depends upon atmospheric temperature and the kind of oil employed. During the colder seasons a longer time is required for completing the solution of the alcohol and oil. When mineral oils are employed a greater length of time is required, and in some cases may approximate ten (10) days. Solution "C" forms the subject matter of my Patent No. 1,605,377 referred to above.

It may be necessary every twenty-four (24) hours to agitate the solution in order to aid in dissolving the oil in the alcohol and heat may be applied in order to advance the solution.

The alcohol employed is obtained under Government regulations and is designated as No. 1 Government permit and includes one hundred (100) gallons of ethyl alcohol and five (5) gallons of wood or methyl alcohol. Before adding this solution to either of the above named solutions, said solution should have the temperature reduced to approximately seventy (70) degrees centigrade or slightly less than the boiling point of the solution. Solutions "A" or "B" should be approximately forty (40) degrees centigrade before adding solution "C" to the same.

The last mentioned solution or addition may be made in the following manner: The oil and alcohol are boiled in a percolator for approximately five (5) minutes and allowed to stand twenty-four (24) hours after which the solution is again brought to a boil and maintained at boiling point from five (5) to ten (10) minutes, after which this boiled solution is set aside and allowed to remain for twenty-four (24) hours. This solution, designated as "D" is then ready for mixing with the first mentioned solutions "A" or "B", when the temperature of the solution "D" is slightly less than boiling, or approximately seventy (70) degrees centigrade.

The oil which my experience shows is the most efficient for the purpose is that obtained directly from the Indian or castor bean and these beans are either steeped in hot calcium chloride and then pressed to force out their oil, after which the whole is boiled for a length of time as stated above, or the crushed beans are slowly boiled from fifteen (15) to twenty (20) minutes directly in the calcium chloride solution, the calcium chloride solution taking up a predetermined quantity of the oil or fatty matter of the beans.

While I preferably use castor oil obtained directly from the bean it must be borne in mind that other oils and fats may be employed for the purpose and treated in a similar manner. Unsaturated oils may be employed for the purpose such as linseed oil, hemp oil, poppyseed oil, sun flower seed oil, maize oil, cotton seed oil, almond oil, peanut oil, olive oil, palm oil, cocoa-butter, cocoanut oil, beef tallow and butter fat, and any other such oil which will readily take up a halogen without the substitution of hydrogen atoms.

It will be appreciated that any of the oils or fats described in my Patent No. 1,605,277 may be employed in connection with the manufacture of the second mentioned solution and in which alcohol is used.

This anti-freezing solution provides a medium for protecting metals from chemical solutions and the metal container may be first treated with the solutions "A" or "B" which contain a greater quantity of the fats and oils than the third mentioned solution which contains an alcohol-oil or alcohol-fat solution for coating the metal container with a sufficient thickness or film of fat to protect the metal of the container from the action of the chemicals. When this solution is placed in any container or receptacle or refrigerating plant and chilled, the fats and oils in the solution will become disassociated from the alcohol or released therefrom and be deposited on the metal container in a film, the thickness of which depends upon the quantity of the oil or fat in the solution.

When the alcohol solution designated as "C" is added to either of the solutions "A" or "B" which contain the calcium chloride and oil the solutions are thoroughy agitated after which the same is heated to approximately the temperature at which the alcohol will boil. Since solution "D" is approximately the same as solution "C" the same method is pursued as described above when mixing solution "D" with either of the solutions "A" or "B".

The Indian bean commonly known as the cator oil seed is the seed of *Ricinus communis*, a plant which grows as a tree in warm countries, attaining the height of approximately forty (40) feet, but which in colder climates is only an annual shrub. These seeds contain from forty-six (46) to fifty-three (53) per cent of oil and contain a small proportion of glycerides and of steric acid.

What I claim is:

1. A process for forming an anti-freezing solution comprising treating crushed or ground vegetable matter containing fats or oils with a calcium chloride solution.

2. A process for forming an anti-freezing solution which comprises heating vegetable matter containing an oil or fat in a solution of calcium chloride.

3. A process for forming an anti-freezing solution which comprises heating a vegetable matter containing a fat or oil in a calcium chloride solution from fifteen (15) to twenty (20) minutes.

4. A process for forming an anti-freezing solution which comprises boiling a mixture of a calcium chloride solution and a vegetable matter containing oils in the proportions of approximately three (3) ounces of vegetable matter and one (1) gallon of calcium chloride, and thoroughly agitating during boiling.

5. A process for forming an anti-freeing solution which comprises boiling a mixture of a calcium chloride solution and a vegetable matter containing oils in the proportions of approximately three (3) ounces of vegetable matter and one (1) gallon of calcium chloride, the strength of the calcium chloride being approximately thirty (30) per cent Baumé.

6. A process for forming an anti-freezing solution which comprises slowly boiling a mixture of an oily or fatty matter derived from vegetable matter for approximately fifteen (15) to twenty (20) minutes, thoroughly agitating the mixture while boiling, and then removing the clear liquid from the solution while the same is still hot.

7. A process for forming an anti-freezing solution comprising treating crushed or ground vegetable matter containing a fat with a calcium chloride solution, and then thoroughly mixing the solution of the oil and calcium chloride with denatured alcohol.

8. A process for forming an anti-freezing solution which comprises boiling a mixture of approximately three (3) ounces of oily or fatty matter of animal or vegetable origin in approximately one (1) gallon of the solution of calcium chloride, removing the clear liquid, cooling the solution to approximately forty (40) degrees Centigrade, and then adding the solution of the mixture of one and one-half (1½) ounces of an oil and one (1) quart of denatured alcohol.

9. A process for forming an anti-freezing solution which comprises boiling a mixture of approximately three (3) ounces of oily or fatty matter of animal or vegetable origin in approximately one (1) gallon of the solution of calcium chloride, removing the clear liquid, cooling the solution to approximately forty (40) degrees Centigrade, and then adding the solution of the mixture of one and one-half (1½) ounces of an oil and one (1) quart of alcohol, said alcohol comprising a solution of one (1) part of methyl alcohol and twenty (20) parts of ethyl alcohol.

10. A process for forming an anti-freezing solution which comprises boiling a mixture of approximately three (3) ounces of oily or fatty matter of animal or vetgetable origin in approximately one (1) gallon of the solution of calcium chloride, removing the clear liquid, cooling the solution to approximately forty (40) degrees Centigrade, and then adding the solution of the mixture of one and one-half (1½) ounces of an oil and one (1) quart of denatured alcohol, the temperature at which the first mentioned solution is boiled being from ninety (90) to one hundred (100) degrees Centigrade, and the calcium chloride having approximately the specific gravity of thirty (30) degrees Baumé.

11. An anti-freezing solution comprising a boiled solution of approximately three (3) ounces of oily matter of animal or vegetable origin and approximately one (1) gallon of calcium chloride.

12. An anti-freezing solution comprising a boiled solution of approximately three (3) ounces of oily matter of animal or vegetable origin and approximately one (1) gallon of calcium chloride, and having a specific gravity of approximately thirty (30) degrees Baumé.

13. A process for forming an anti-freezing solution which comprises heating ground Indian bean with a calcium chloride solution.

14. A process for forming an anti-freezing solution which comprises boiling a mixture of calcium chloride solution and India beans in the proportions of approximately three ounces of India beans and one gallon of calcium chloride.

GUSTAV A. SCHULTHEISS.